United States Patent
Suleiman et al.

(10) Patent No.: US 12,249,092 B2
(45) Date of Patent: Mar. 11, 2025

(54) VISUAL INERTIAL ODOMETRY LOCALIZATION USING SPARSE SENSORS

(71) Applicant: META PLATFORMS TECHNOLOGIES, LLC, Menlo Park, CA (US)

(72) Inventors: Amr Suleiman, Sammamish, WA (US); Anastasios Mourikis, Seattle, WA (US); Armin Alaghi, Kirkland, WA (US); Andrew Samuel Berkovich, Sammamish, WA (US); Shlomo Alkalay, Redmond, WA (US); Muzaffer Kal, Redmond, WA (US); Vincent Lee, Seattle, WA (US); Richard Andrew Newcombe, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 829 days.

(21) Appl. No.: 17/493,620

(22) Filed: Oct. 4, 2021

(65) Prior Publication Data

US 2022/0122285 A1    Apr. 21, 2022

Related U.S. Application Data

(63) Continuation of application No. 17/472,545, filed on Sep. 10, 2021, now abandoned.
(Continued)

(51) Int. Cl.
G06T 7/73    (2017.01)
G06T 7/00    (2017.01)
G06T 19/00   (2011.01)

(52) U.S. Cl.
CPC .......... *G06T 7/73* (2017.01); *G06T 7/97* (2017.01); *G06T 19/006* (2013.01); *G06T 2200/04* (2013.01)

(58) Field of Classification Search
CPC .......... G06T 7/73; G06T 7/97; G06T 19/006; G06T 2200/04
(Continued)

(56) References Cited

U.S. PATENT DOCUMENTS 9,063,330 B2    6/2015    LaValle et al.
9,964,409 B1    5/2018    Flint et al.
(Continued)

FOREIGN PATENT DOCUMENTS

EP     3419286 A1      12/2018
WO     2013155217 A1   10/2013
(Continued)

OTHER PUBLICATIONS

Balntas V., et al., "HPatches: a Benchmark and Evaluation of Handcrafted and Learned Local Descriptors," Computer Vision and Pattern Recognition (CVPR), Apr. 19, 2017, arXiv:1704.05939v1 [cs.CV], 10 Pages.
(Continued)

*Primary Examiner* — Gabriel I Garcia
(74) *Attorney, Agent, or Firm* — Potomac Law Group, PLLC; Dannon G. Allbee (57) ABSTRACT

In one embodiment, a computing system accesses a set of 3D locations associated with features in an environment previously captured by a camera from a previous camera pose. The computing system determines a predicted camera pose using the previous camera pose and motion measurements generated using a motion sensor associated with the camera. The computing system projects the set of 3D locations toward the predicted camera pose and onto a 2D
(Continued)

image plane associated with the camera. The computing system generates, based on the projected set of 3D locations on the 2D image plane, an activation map specifying a subset of the pixel sensors of the camera that are to be activated. The computing system instructs, using the activation map, the camera to activate the subset of pixel sensors to capture a new image of the environment. The computing system reads pixel values of the new image.

20 Claims, 6 Drawing Sheets

Related U.S. Application Data (60) Provisional application No. 63/078,794, filed on Sep. 15, 2020.
(58) Field of Classification Search
USPC .......................................................... 382/102
See application file for complete search history.

(56) References Cited

U.S. PATENT DOCUMENTS

| | | | |
|---|---|---|---|
| 10,338,392 B2 | 7/2019 | Kohler et al. | |
| 10,346,623 B1 | 7/2019 | Brandwine et al. | |
| 10,466,953 B2 | 11/2019 | Eade et al. | |
| 10,657,701 B2 | 5/2020 | Osman et al. | |
| 11,024,079 B1 | 6/2021 | Chuah et al. | |
| 11,158,130 B1* | 10/2021 | Rubaiat Habib | G06F 3/011 |
| 11,222,468 B1* | 1/2022 | Lovegrove | G06T 19/006 |
| 11,481,925 B1 | 10/2022 | Li et al. | |
| 11,670,045 B2 | 6/2023 | Zhang et al. | |
| 2005/0249426 A1 | 11/2005 | Badawy | |
| 2012/0300020 A1 | 11/2012 | Arth et al. | |
| 2012/0306850 A1 | 12/2012 | Balan et al. | |
| 2014/0267234 A1 | 9/2014 | Hook et al. | |
| 2015/0029218 A1 | 1/2015 | Williams et al. | |
| 2015/0062125 A1 | 3/2015 | Aguilera Perez et al. | |
| 2015/0331970 A1* | 11/2015 | Jovanovic | G06T 15/10 703/1 |
| 2016/0364912 A1 | 12/2016 | Cho et al. | |
| 2017/0115488 A1 | 4/2017 | Ambrus et al. | |
| 2017/0243403 A1 | 8/2017 | Daniels et al. | |
| 2017/0337749 A1 | 11/2017 | Nerurkar et al. | |
| 2017/0345167 A1 | 11/2017 | Ard et al. | |
| 2018/0053329 A1 | 2/2018 | Roberts et al. | |
| 2018/0122139 A1 | 5/2018 | Janzer et al. | |
| 2018/0143023 A1 | 5/2018 | Bjorke et al. | |
| 2018/0143756 A1 | 5/2018 | Mildrew et al. | |
| 2018/0144547 A1 | 5/2018 | Shakib et al. | |
| 2018/0232937 A1 | 8/2018 | Moyer et al. | |
| 2019/0026956 A1 | 1/2019 | Gausebeck et al. | |
| 2019/0051054 A1* | 2/2019 | Jovanovic | G06F 3/04815 |
| 2019/0236842 A1 | 8/2019 | Bennett et al. | |
| 2019/0287311 A1 | 9/2019 | Bhatnagar et al. | |
| 2020/0066046 A1 | 2/2020 | Stahl et al. | |
| 2020/0099954 A1 | 3/2020 | Hemmer et al. | |
| 2020/0175764 A1 | 6/2020 | Romea et al. | |
| 2020/0250879 A1 | 8/2020 | Foster et al. | |
| 2020/0302681 A1 | 9/2020 | Totty et al. | |
| 2020/0364901 A1* | 11/2020 | Choudhuri | G06F 3/005 |
| 2021/0056762 A1 | 2/2021 | Robbe et al. | |
| 2021/0304509 A1 | 9/2021 | Berkebile | |
| 2021/0326026 A1 | 10/2021 | Osipov et al. | |
| 2022/0043446 A1 | 2/2022 | Ding et al. | |
| 2022/0254207 A1 | 8/2022 | Billy et al. | |
| 2022/0269885 A1 | 8/2022 | Wixson et al. | |
| 2023/0125390 A1 | 4/2023 | Noris et al. | |
| 2023/0127307 A1 | 4/2023 | Noris et al. | |
| 2023/0237692 A1 | 7/2023 | Alaghi et al. | |

FOREIGN PATENT DOCUMENTS

| | | |
|---|---|---|
| WO | 2015192117 A1 | 12/2015 |
| WO | 2021010660 A1 | 1/2021 |
| WO | 2021188741 A1 | 9/2021 |

OTHER PUBLICATIONS

International Preliminary Report on Patentability for International Application No. PCT/US2022/047864, mailed May 10, 2024, 12 pages.
International Preliminary Report on Patentability for International Application No. PCT/US2023/011579, mailed Aug. 8, 2024, 10 pages.
International Search Report and Written Opinion for International Application No. PCT/US2020/027763, mailed Jul. 23, 2020, 12 Pages.
International Search Report and Written Opinion for International Application No. PCT/US2022/047864, mailed Apr. 6, 2023, 15 pages.
International Search Report and Written Opinion for International Application No. PCT/US2022/052472, mailed Apr. 17, 2023, 11 pages.
International Search Report and Written Opinion for International Application No. PCT/US2023/011579, mailed May 17, 2023, 12 pages.
Morrison J. G., et al., "Scalable Multirobot Localization and Mapping with Relative Maps: Introducing MOARSLAM," IEEE Control Systems, vol. 36, No. 2, Apr. 1, 2016, pp. 75-85.
Mur-Artal R., et al., "ORB-SLAM: a Versatile and Accurate Monocular SLAM System," IEEE Transactions on Robotics, Sep. 18, 2015, arXiv:1502.00956v2 [cs. RO], 18 Pages, Doi: 10.1109/TRO.2015.2463671.
Tian Y., et al., "SOSNet: Second Order Similarity Regularization for Local Descriptor Learning," Computer Vision and Pattern Recognition (CVPR), Dec. 16, 2019, arXiv:1904.05019v2 [cs.CV], 10 Pages.

* cited by examiner

VISUAL INERTIAL ODOMETRY LOCALIZATION USING SPARSE SENSORS

PRIORITY

This application is a continuation under 35 U.S.C. § 120 of U.S. patent application Ser. No. 17/472,545, filed 10 Sep. 2021, which claims the benefit under 35 U.S.C. § 119(e) of U.S. Provisional Patent Application No. 63/078,794, filed 15 Sep. 2020, which are incorporated herein by reference.

TECHNICAL FIELD

This disclosure generally relates to controls and interfaces for user interactions and experiences in an augmented reality environment.

BACKGROUND

Augmented reality is a computer-generated simulation applied to an environment that users can interact with in a seemingly real or physical way. An augmented reality system, which may be a single device or a group of devices, may generate this simulation for display to a user, for example, on an augmented reality headset or some other display device. The simulation may include images, sounds, haptic feedback, and/or other sensations. As augmented reality becomes more and more prominent, its range of useful applications is rapidly broadening. The most common applications of augmented reality involve games or other interactive content, but other applications such as the viewing of visual media items (e.g., photos, videos) for entertainment or training purposes are close behind.

SUMMARY OF PARTICULAR EMBODIMENTS

Disclosed herein are a variety of different ways of rendering and interacting with an augmented (or virtual) reality environment. An augmented reality system may render augmented reality elements to be applied to an environment (e.g., a real world scene), which may include virtual elements that is rendered for display to a user to be applied to a real-world environment. Artificial reality systems may have a limited power budget given the form factor of the artificial reality systems. Since artificial reality systems, such as an augmented reality system, may be used to interact with a real-world environment, the artificial reality systems may need to be embodied as a portable computing system for a user to interact with different environments. As an example and not by way of limitation, the artificial reality system may be a head-mounted display (HMD) that a user may wear. In order for an artificial reality system to interact with a real-world environment, the artificial reality system may need to capture images (with one or more cameras coupled to or included in the artificial reality system) of the real-world environment to build a three-dimensional (3D) model of a scene, determine a pose of a headset, and the like. However, the process of capturing images, and more specifically sensor captures and reads may be power intensive. This may especially be the case for always-on devices. While some processes may need a full image to function properly, the process of determining a pose of the artificial reality system (e.g., a headset) may need only a small percentage of an image captured to localize the headset. As an example and not by way of limitation, 10% of the pixels of an image may be needed for localizing a headset.

In order to reduce the power used for a process of determining the pose of an artificial reality system (e.g., headset), the artificial reality system may use a visual inertial odometry (VIO). The VIO may determine the pose of an artificial reality system by tracking environmental features observed by the artificial reality system. As an example and not by way of limitation, the VIO may determine the pose of an augmented reality headset by tracking a table within an environment. For a given series of frames (comprising images) that are captured, an artificial reality system may predict the pose of the headset in a next frame in the series of frames. The predicted pose of the artificial reality system may be used to determine where features of interests would likely be within a field of view of the camera. The artificial reality system may instruct the camera sensor to only capture pixels near the predicted feature locations to generate a sparse image capture. The sparse image capture may then be used by VIO to determine the pose of the artificial reality system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Artificial reality systems may have a limited power budget given the form factor of the artificial reality systems. Since artificial reality systems, such as an augmented reality system, may be used to interact with a real-world environment, the artificial reality systems may need to be embodied as a portable computing system for a user to interact with different environments. As an example and not by way of limitation, the artificial reality system may be a head-mounted display (HMD) that a user may wear. In order for an artificial reality system to interact with a real-world environment, the artificial reality system may need to capture images (with one or more cameras coupled to or included in the artificial reality system) of the real-world environment to build a three-dimensional (3D) model of a scene, determine a pose of a headset, and the like. However, the process of capturing images, and more specifically sensor captures and reads may be power intensive. This may especially be the case for always-on devices. While some processes may need a full image to function properly, the process of determining a pose of the artificial reality system (e.g., a headset) may need only a small percentage of an image captured to localize the headset. As an example and not by way of limitation, 10% of the pixels of an image may be needed for localizing a headset.

In order to reduce the power used for a process of determining the pose of an artificial reality system (e.g., headset), the artificial reality system may use a visual inertial odometry (VIO). The VIO may determine the pose of an artificial reality system by tracking environmental features observed by the artificial reality system. As an example and not by way of limitation, the VIO may determine the pose of an augmented reality headset by tracking a table within an environment. For a given series of frames (comprising images) that are captured, an artificial reality system may predict the pose of the headset in a next frame in the series of frames. The predicted pose of the artificial reality system may be used to determine where features of interests would likely be within a field of view of the camera. The artificial reality system may instruct the camera sensor to only capture pixels near the predicted feature locations to generate a sparse image capture. The sparse image capture may then be used by VIO to determine the pose of the artificial reality system.

In particular embodiments, a computing system may comprise a VIO system. As an example and not by way of limitation, an artificial reality system may comprise a VIO system. In particular embodiments, the computing system may be embodied as an artificial reality system. In particular embodiments, the artificial reality system may be embodied as an augmented reality system or a virtual reality system. The artificial reality system may track a set of feature points within a series of frames through the VIO system using one or more cameras. The set of feature points may be with respect to a 3D environment. As an example and not by way of limitation, if a 3D scene comprises a living room with a desk, then a set of feature points may correspond to the corners of the desk. Each of the feature points may be associated with a 3D location within the 3D environment. The feature points may be indicative of a landmark in the environment. In particular embodiments, the artificial reality system may capture a plurality of frames containing a plurality of images using a camera. The artificial reality system may process a set of the plurality of images to identify the feature points in the environment. In particular embodiments, the VIO system may receive data from one or more sensors. The VIO system may use the data from the one or more sensors to localize the artificial reality system. As an example and not by way of limitation, the VIO system may use the data from sensors to determine a pose of the artificial reality system within a 3D scene. For instance, if a user is wearing the artificial reality system within the living room, the artificial reality system may determine where the user is with respect to objects in the living room using one or more of cameras, inertial measurement unit, accelerometer, motion sensors, and the like. In particular embodiments, the artificial reality system may identify features of interest that would be within a field of view of the camera. The features of interest may comprise edges of objects, corners of objects, and the like. As an example and not by way of limitation, the artificial reality system may identify a corner of a table as a feature of interest and track the corner of the table from one frame to a subsequent frame. The artificial reality system may store a set of 3D locations associated with the feature points in the 3D environment. The feature points in the 3D environment may be captured by one or more cameras of the artificial reality system at a camera pose. The camera pose may be a previous camera pose of the cameras. The artificial reality system may access the set of 3D locations stored on the artificial reality system. Although this disclosure describes tracking a set of feature points in a particular manner, this disclosure contemplates tracking a set of feature points in any suitable manner.

In particular embodiments, the artificial reality system may predict a location of where feature points are expected to appear in an image sensor. The artificial reality system may use the VIO system to track a set of feature points and predict the locations of where the set of feature points will appear in an image sensor. The feature points may be from previously observed feature points in previous frames. In particular embodiments, the artificial reality system may determine a predicted camera pose using the previous camera pose and motion measurements generated using a motion sensor associated with the camera of the artificial reality system. In particular embodiments, the motion sensor may include an inertial measurement unit (IMU) and the motion measurements may be data generated by the IMU. The predicted camera pose may be an IMU-based estimated pose. Although this disclosure describes predicting a location of where points are expected in a particular manner, this disclosure contemplates predicting a location of where points are expected in any suitable manner.

In particular embodiments, the artificial reality system may generate an occupancy grid corresponding to pixels of an image or image sensor. The occupancy grid may indicate which pixel or groups of pixels of an image would likely be occupied by projected feature points if the camera is to capture an image of the environment from its predicted pose. In particular embodiments, the artificial reality system may use the occupancy grid to organize where feature points are expected to appear in an image sensor. For instance, the artificial reality system may track a set of feature points (e.g., feature point with known 3D locations based on computations made in the previous frame) and project the set of feature points to the corresponding locations in the occupancy grid. In particular embodiments, the artificial reality system may project the set of 3D locations toward the predicted camera pose and onto a 2D image plane associated with the camera of the artificial reality system. In particular embodiments, the camera of the artificial reality system may comprise a camera model. The camera model may include one or more intrinsic camera parameters of the camera and one or more camera lens distortion characteristics. The artificial reality system may access the one or more intrinsic camera parameters and one or more camera lens distortion characteristics to project the 3D locations toward the predicted camera pose and onto the 2D image plane. In particular embodiments, the artificial reality system may generate the occupancy grid based on the projection of the set of 3D locations toward the predicted camera pose and onto the 2D image plane. Although this disclosure describes generating an occupancy grid in a particular manner, this disclosure contemplates generating an occupancy grid in any suitable manner.

In particular embodiments, the occupancy grid may be divided into grids. The grids of the occupancy grid may be occupied by the estimated projection points. The estimated projection points may correspond to where a set of feature points are estimated to appear in an image if the image is captured from a predicted camera pose in the next frame. In particular embodiments, the resolution or grid size of the occupancy grid may depend on a desired number of estimated projection points within each grid (e.g., the resolution or grid size may be set so that most grids have no more than n projection points). In particular embodiments, the division of the occupancy grid into grids may be based on the estimated projection points so that only a threshold number of estimated projection points are located in each grid. Some grids may be empty of estimated projection points.

In particular embodiments, the artificial reality system may generate a pixel activation map for activating particular pixel sensors of a camera and/or indicating which pixels captured by the camera are to be read out from the image buffer. In particular embodiments, the artificial reality system may generate the activation map based on the projected set of 3D locations on the 2D image plane. The artificial reality system may use the occupancy grid to generate the pixel activation map. The pixel activation map may indicate which pixels of a camera to activate and/or which pixel values are to be read. The artificial reality system may use the VIO system to generate the pixel activation map for the camera. In particular embodiments, the artificial reality system may determine which pixels of an image sensor are of interest. The pixels of interest may be the pixels of the camera that the artificial reality system would activate and/or read out. Although this disclosure contemplates generating a pixel activation map in a particular manner, this disclosure contemplates generating a pixel activation map in any suitable manner.

In particular embodiments, the pixel activation map may include pixels that need to be searched to find the previously observed feature points. In particular embodiments, the artificial reality system may compute epipolar lines based on the location of where a feature point of interest appeared in the last frame, the pose of the camera in the last frame, and the predicted pose of the camera in the current frame. The artificial reality system may generate the epipolar lines based on the projection of the set of 3D locations toward the predicted camera pose and onto the 2D image plane. The epipolar lines may reduce the search space for the points of interest. The computed epipolar lines may be expanded to define an epipolar search space. In particular embodiments, the epipolar search space may be represented by small dots (if the line is very short) and line segments. In particular embodiments, the artificial reality system may instruct the camera to activate a subset of pixel sensors to capture a new image of the environment by using the activation map. A subset of pixel sensors may be a fraction of the available pixel sensors of the camera. As an example and not by way of limitation, the subset of pixel sensors may be 50% of the pixel sensors of the camera. As such, the artificial reality system may instruct the camera to activate 50% of the pixel sensors of the camera and not activate the other 50% of the pixel sensors. The artificial reality system may read pixel values of the new image corresponding to the subset of pixel sensors activated by the camera. The artificial reality system may track the feature points in the environment based on the pixel values. Although this disclosure describes a pixel activation map in a particular manner, this disclosure contemplates a pixel activation map in any suitable manner.

The pixel activation map may additionally or alternatively include regions that should be searched to find new features of interest. In particular embodiments, the artificial reality system may use the occupancy grid to determine areas that are empty. The empty grids in the occupancy grid indicate that the corresponding regions in the to-be captured image lack features. As an example and not by way of limitation, the artificial reality system may identify areas in the occupancy grid greater than a threshold area that fails to contain a point of interest. For instance, after the artificial reality system projects feature points onto the occupancy grid, the artificial reality system may determine which grids lack any estimated projection points. In particular embodiments, the artificial reality system may analyze one or more unoccupied cells in the occupancy grid to determine whether to include the one or more unoccupied cells in the activation map. In particular embodiments, the artificial reality system may decide to search the pixels of the to-be-captured image corresponding to those empty grids or unoccupied cells in the occupancy grid. The determination or decision may be based on a predetermined framerate. As an example and not by way of limitation, if the camera framerate is 90 frames per second, then the artificial reality system may determine to include unoccupied cells in a tenth of the captured frames. The frequency at which unoccupied cells may be included may be lower than the camera framerate. The system may do so by including the pixels corresponding to those empty grids in the pixel activation map.

In particular embodiments, the artificial reality system may aggregate epipolar line search and an empty grid search to generate the pixel activation map. In particular embodiments, the pixel activation map may be sent to the camera of the artificial reality system. In particular embodiments, the camera may capture the corresponding pixels indicated by the pixel activation map, which may then be read out according to the pixel activation map. Pixels not activated by the pixel activation map will not be activated by the camera and will not be read out, thereby providing significant power savings without sacrificing the tracking quality of the VIO system. In particular embodiments, the artificial reality system may store the resulting read pixels to be processed. In particular embodiments, the resulting read pixels may be used to find known points (e.g., features points) and find new points for tracking and/or localization. Although this disclosure describes generating a pixel activation map for a camera in a particular manner, this disclosure contemplates generating a pixel activation map for a camera in any suitable manner.

Figure 1:
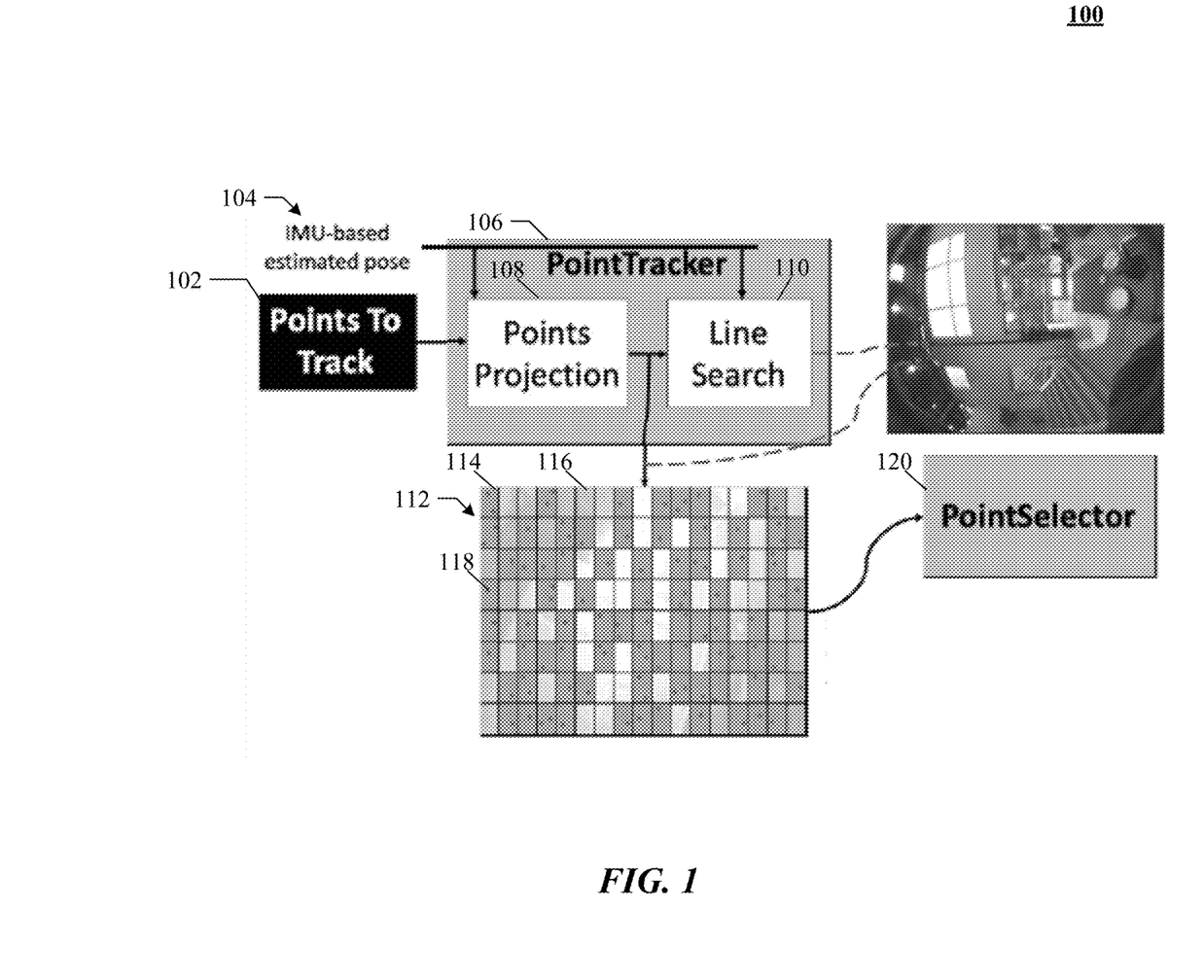
FIG. 1 illustrates an example diagram of a process of localizing an artificial reality system.

Referring to FIG. 1, a diagram of an artificial reality system localization process 100 is shown. The process 100 may illustrate the embodiments described herein. A computing system may perform the process 100. As an example and not by way of limitation, an artificial reality system may perform the process 100. The process 100 may begin with the system (e.g., an artificial reality system) receiving an input indicative of the points to track 102. For instance, the points to track 102 may be the feature points as described herein. The system may use the VIO system to generate an IMU-based estimated pose 104 of the system. The IMU-based estimated pose 104 may be used with the points to track 102 as an input into a point tracker 106. The point tracker 106 may include point projection 108 and line search 110. The points projection process 108 may process the points to track 102 and the IMU-based estimated pose 104 to generate an occupancy grid 112. The points projection process 108 may use approximate point location to update the occupancy grid 112. The line search 110 may use both the IMU-based estimated pose 104 and the output of the points projection process 108 to compute the epipolar lines. The output of the points projection process 108 and the output of the line search 110 may be used to generate the occupancy grid 112. The occupancy grid 112 may include occupied cells 114 and unoccupied cells 116, where the occupied cells 114 include projected points 118. The occupancy grid 112 may be used as an input to a point selector process 120 to generate the pixel activation map as described herein. The point selector process 120 may process the unoccupied cells 116 to determine whether to select one or more points. In particular embodiments, one or more processes of the localization process 100 may be performed in parallel. As an example and not by way of limitation, the line search 110 may be performed in parallel to the point selector 120. The system may determine to perform one or more processes of the process 100 at a predetermined interval. The predetermined interval may be less than a framerate of a camera of the system that is continuously capturing images. As an example and not by way of limitation, if the system has a camera capturing 90 frames per second, the system may perform the point selector process 120 at 30 frames per second. The point selector 120 may identify areas of the occupancy grid 112 to explore. It may be beneficial to have a wide distribution of key points across the image space. As such, the system may identify areas that are too empty or lack points of interests or feature points. The system may periodically add areas to explore. For instance, for every 10 frames a region may be added to the activation map to explore.

Figure 2:
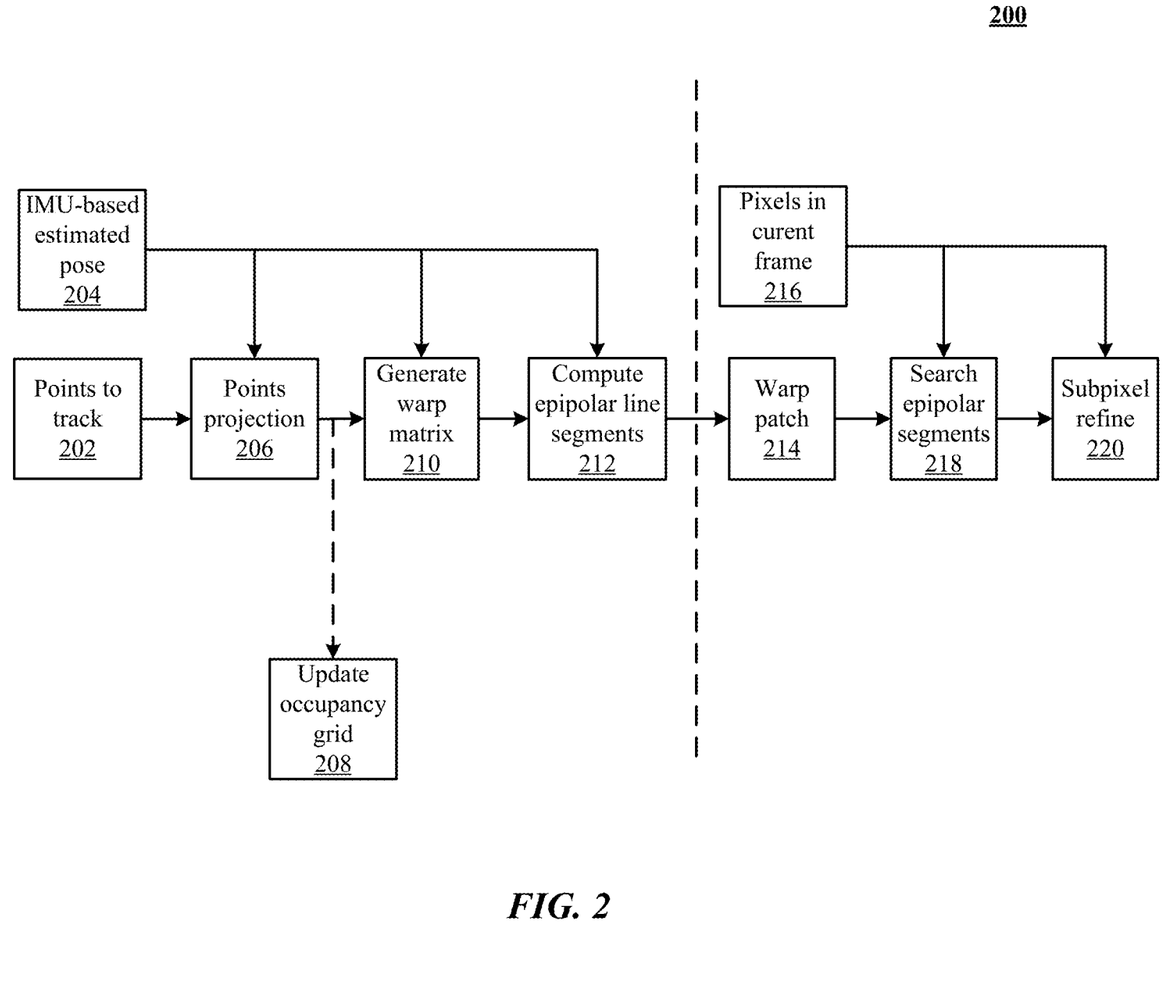
FIG. 2 illustrates an example flowchart of a process of generating an activation map.

Referring to FIG. 2, an example process 200 of generating an activation map is shown. A computing system may perform the process 200. As an example and not by way of limitation, an artificial reality system may perform the process 200. The process 200 may begin with the system receiving an input indicative of points to track 202. For instance, the points to track 202 may be the feature points as described herein. The feature points may be identified by processing a plurality of images as described herein. The system may use the VIO system to generate an IMU-based estimated pose 204 of the system. The IMU-based estimated pose 204 may be used for points projection 206, generating a warp matrix 210, and computing epipolar line segments 212. The points projection 206 may process points to track 202 and IMU-based estimated pose 204 to update the occupancy grid 208. The projected points from the points projection 206 may be sent to generate a warp matrix 210. The warp matrix may be used to account for the lens distortion and the movement of the system. The warp matrix may be used to change the view from a captured image to another view. The warp matrix may be used to warp patches of previously-identified points (e.g., features of interest, feature points, and the like) in order to orient the patch to be included in an activation map that would select pixel sensors corresponding to the previously-identified points in the current frame. The output of the warp matrix may be used to compute epipolar line segments 212. The epipolar lines may be added to the activation map as described herein. The processes 202, 206, 210, and 212 may be done before pixels of the camera are exposed. The generation of the warp matrix 210 and the computation of the epipolar line segments 212 may be used for line search metadata generation. The processes 214, 218, and 220 may be done after pixels of the camera are exposed. For instance, after an image is captured using an activation map generated from the occupancy map and the epipolar line segments. The processes 214, 218, and 220 may also be used for line search computation. The process 200 may proceed with applying the warp matrix in the warp patch 214 after capturing the image using the activation map. After warping the patch 214 using the warp matrix, the process 200 may search the epipolar segments 218 using pixels in the current frame 216. The search of the epipolar segments 218 may be for warped patches in the currently captured pixels. The subpixel refine 220 may be used after identifying a warped patch to search the warped patch at a finer level to identify feature points. The process 200 may also mathematically compute the most likely location of feature points by using the confidence scores as weights.

Figure 3:
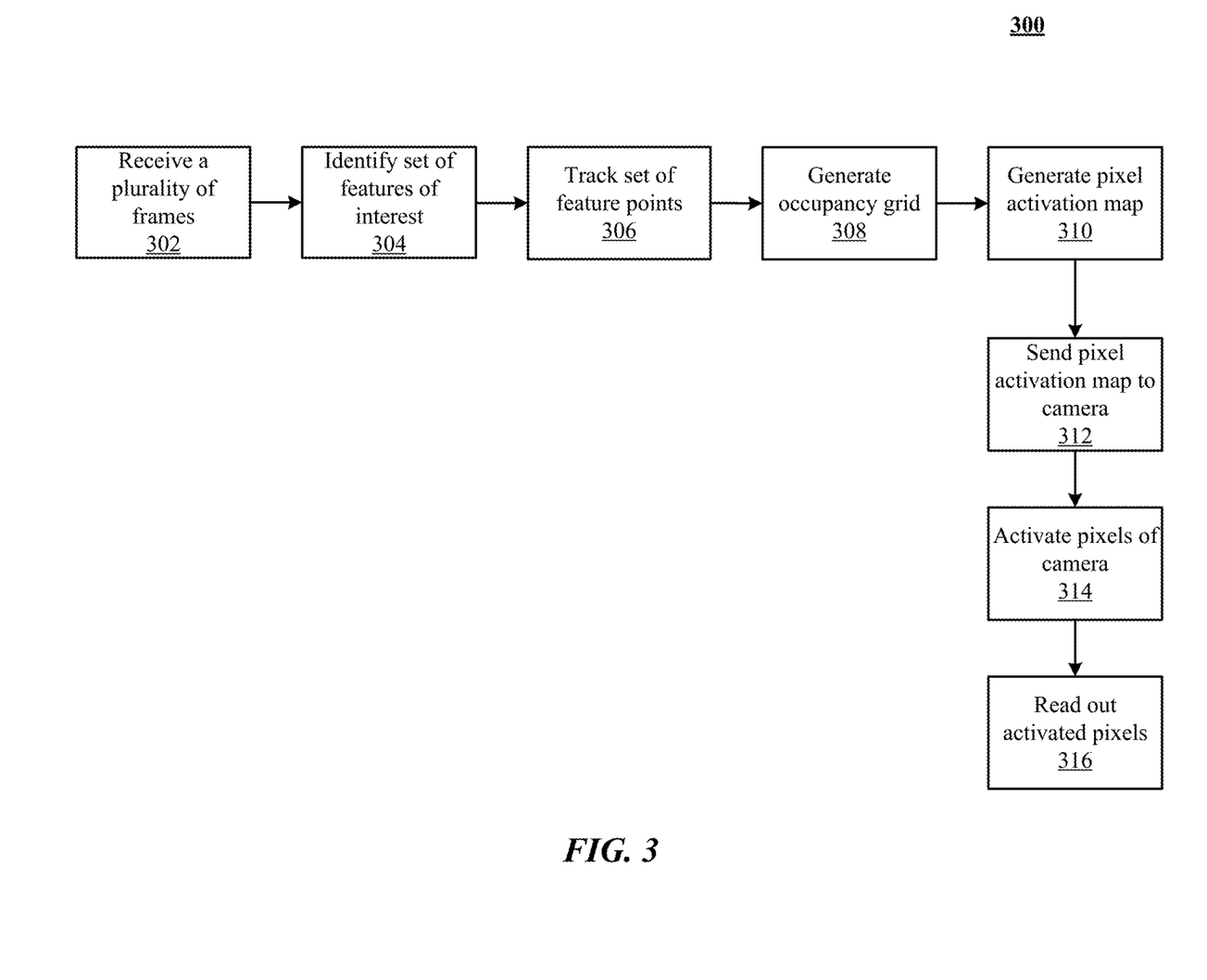
FIG. 3 illustrates an example flowchart of a process of localizing an artificial reality system.

Referring to FIG. 3, an artificial reality system localization process 300 is shown. In particular embodiments, a system may perform the localization process 300 as described herein. As an example and not by way of limitation, an artificial reality system may perform the localization process 300. For example, an augmented reality system may perform the localization process 300. The process 300 may begin with the system receiving a plurality of frames in step 302. As an example and not by way of limitation, the system may receive a plurality of images corresponding to a scene. For instance an augmented reality system may capture images of a scene using one or more cameras. In step 304, the system may identify a set of features of interest as described herein. As an example and not by way of limitation, the system may identify corners of tables captured within the images. In step 306, the system may use a VIO system to track the set of feature points that are identified from the set of features of interest as described herein. In step 308, the system may generate an occupancy grid as described herein. The system may use the VIO system to estimate where the feature points will likely be located in a current frame by projecting the 3D feature points to the 2D image space of a camera located at a predicted pose. The projected points may be used to generate an occupancy grid. In step 310, the system may generate a pixel activation map as described herein. As an example and not by way of limitation, the system may use the occupancy grid and epipolar lines to generate a pixel activation map. In step 312, the system may send the pixel activation map to the camera. If the system has additional cameras, additional pixel activation maps may be generated using the process described herein. In step 314, the system may activate pixels of the one or more cameras based on the pixel activation map. In step 316, the system may read out the activated pixels of the cameras. The system may store the data gathered from step 316 and use the tracked features to perform localization and/or object tracking.

Figure 4:
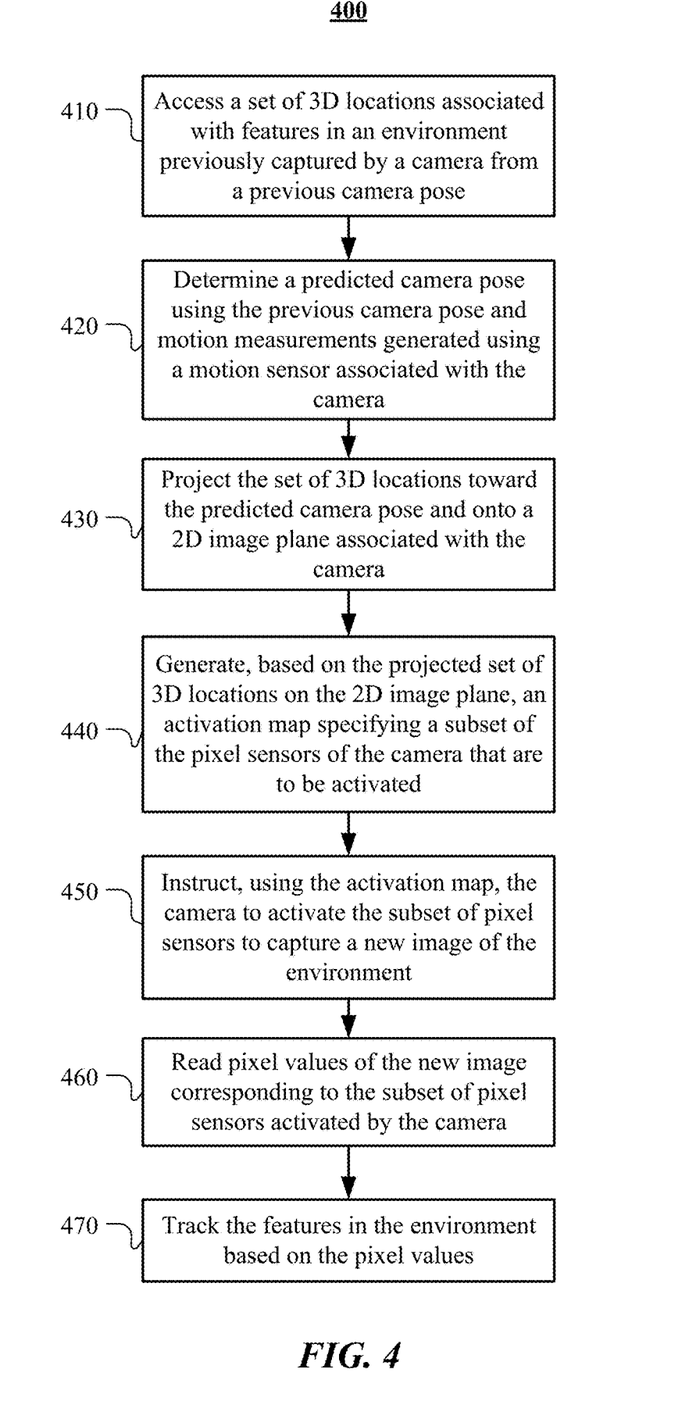
FIG. 4 illustrates an example method for tracking features in an environment.

FIG. 4 illustrates an example method 400 for tracking features in an environment. The method 400 may begin at step 410, where a computing system (e.g., artificial reality system) may access a set of 3D locations associated with features in an environment previously captured by a camera from a previous camera pose. At step 420, the computing system may determine a predicted camera pose using the previous camera pose and motion measurements generated using a motion sensor associated with the camera. At step 430, the computing system may project the set of 3D locations toward the predicted camera pose and onto a 2D image plane associated with the camera. At step 440, the computing system may generate, based on the projected set of 3D locations on the 2D image plane, an activation map specifying a subset of the pixel sensors of the camera that are to be activated. At step 450, the computing system may instruct, using the activation map, the camera to activate the subset of pixel sensors to capture a new image of the environment. At step 460, the computing system may read pixel values of the new image corresponding to the subset of pixel sensors activated by the camera. At step 470, the computing system may track the features in the environment based on the pixel values. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for tracking features in an environment, including the particular steps of the method of FIG. 4, this disclosure contemplates any suitable method of tracking features in an environment, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
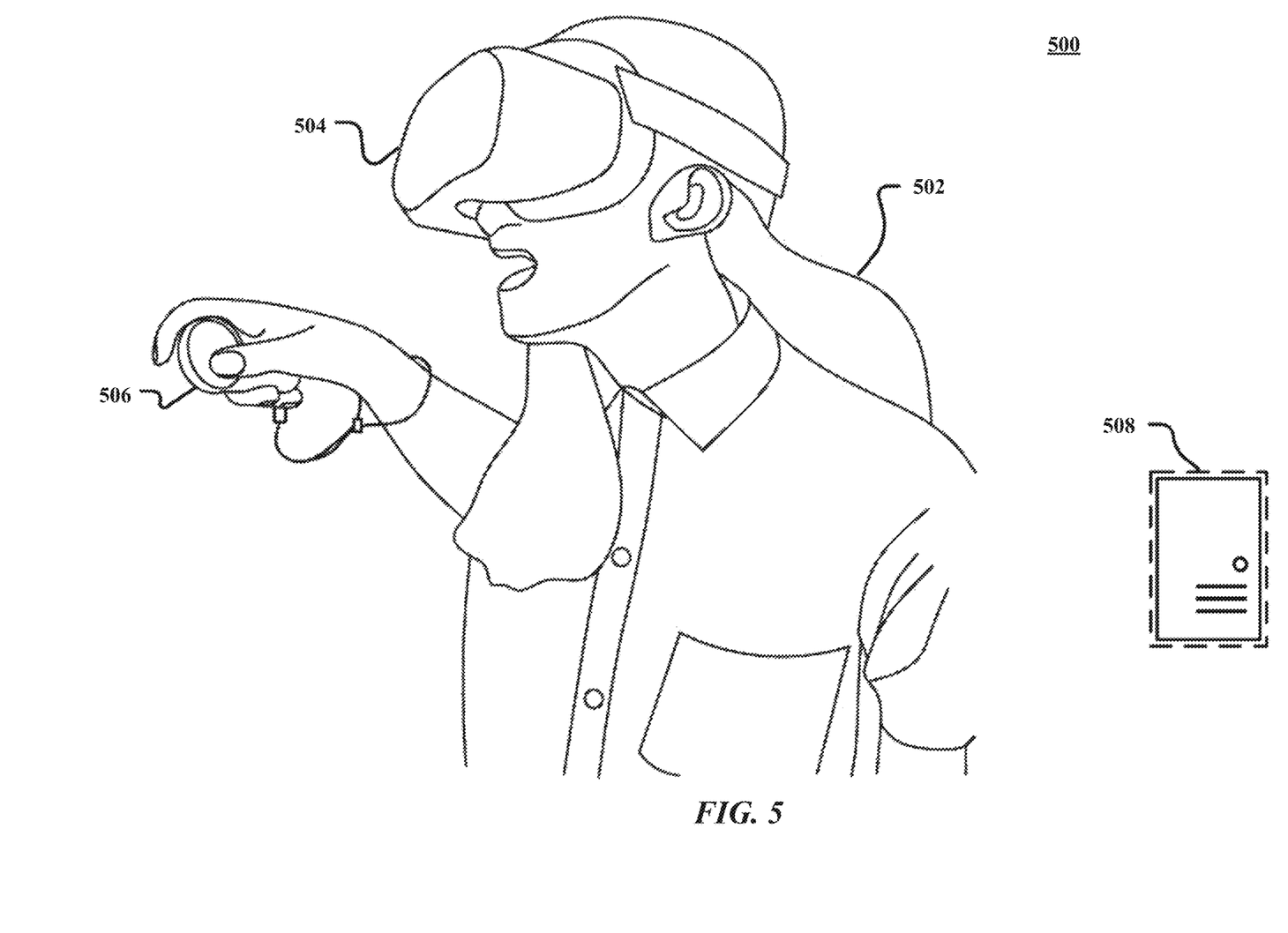
FIG. 5 illustrates an example artificial reality system.

FIG. 5 illustrates an example artificial reality system 500. In particular embodiments, the artificial reality system 500 may comprise a headset 504, a controller 506, and a computing system 508. A user 502 may wear the headset 504 that may display visual artificial reality content to the user 502. The headset 504 may include an audio device that may provide audio artificial reality content to the user 502. As an example and not by way of limitation, the headset 504 may display visual artificial content and audio artificial reality content corresponding to a virtual meeting. The headset 504 may include one or more cameras which can capture images and videos of environments. The headset 504 may include a plurality of sensors to determine a head pose of the user 502. As an example and not by way of limitation, the sensors may include one or more of an accelerometer, inertial measurement unit (IMU), and the like. The headset 504 may include a microphone to receive audio input from the user 502. The headset 504 may be referred as a head-mounted display (HMD). The controller 506 may comprise a trackpad and one or more buttons. The controller 506 may receive inputs from the user 502 and relay the inputs to the computing system 508. The controller 506 may also provide haptic feedback to the user 502. The computing system 508 may be connected to the headset 504 and the controller 506 through cables or wireless connections. The computing system 508 may control the headset 504 and the controller 506 to provide the artificial reality content to and receive inputs from the user 502. The computing system 508 may be a standalone host computer system, an on-board computer system integrated with the headset 504, a mobile device, or any other hardware platform capable of providing artificial reality content to and receiving inputs from the user 502.

Figure 6:
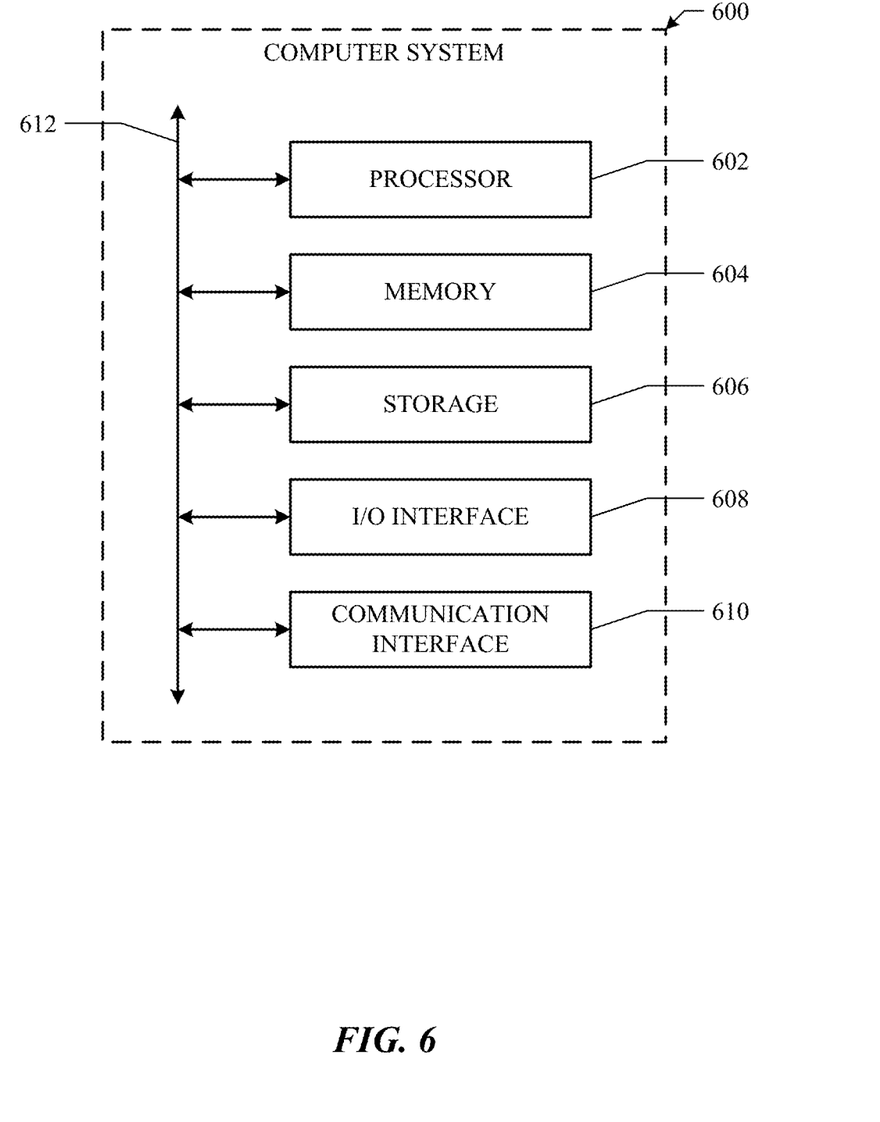
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    accessing a set of 3D locations associated with features in an environment previously captured by a camera from a previous camera pose;
    determining a predicted camera pose using the previous camera pose and motion measurements generated using a motion sensor associated with the camera;
    projecting the set of 3D locations toward the predicted camera pose and onto a 2D image plane associated with the camera;
    generating, based on the projected set of 3D locations on the 2D image plane, an activation map specifying a subset of the pixel sensors of the camera that are to be activated;
    instructing, using the activation map, the camera to activate the subset of pixel sensors to capture a new image of the environment;
    reading pixel values of the new image corresponding to the subset of pixel sensors activated by the camera; and
    tracking the features in the environment based on the pixel values.

2. The method of claim 1, further comprising:
    receiving, from the camera, a plurality of frames containing a plurality of images of the environment; and
    processing a set of the plurality of images to identify the features in the environment, wherein the features are indicative of a landmark in the environment.

3. The method of claim 1, further comprising:
    accessing one or more intrinsic camera parameters of the camera and one or more camera lens distortion characteristics, wherein projecting the set of 3D locations toward the predicted camera pose and onto the 2D image plane is based on the one or more intrinsic camera parameters of the camera and the one or more camera lens distortion characteristics.

4. The method of claim 1, further comprising:
    generating an occupancy grid based on the projection of the set of 3D locations toward the predicted camera pose and onto the 2D image plane, wherein the occupancy grid indicates one or more cells within the occupancy grid that are occupied by the projection of the set of 3D locations toward the predicted camera pose and onto the 2D image plane, and wherein generating the activation map is based on the occupancy grid.

5. The method of claim 4, further comprising:
    analyzing one or more unoccupied cells in the occupancy grid; and determining whether to include the one or more unoccupied cells in the activation map based on a predetermined framerate.

6. The method of claim 5, wherein the camera captures a plurality of images at a first framerate greater than the predetermined framerate.

7. The method of claim 1, further comprising:
generating one or more search lines based on the projection of the set of 3D locations toward the predicted camera pose and onto the 2D image plane, wherein the one or more search lines are included in the activation map.

8. One or more computer-readable non-transitory storage media embodying software that is operable when executed to:
access a set of 3D locations associated with features in an environment previously captured by a camera from a previous camera pose;
determine a predicted camera pose using the previous camera pose and motion measurements generated using a motion sensor associated with the camera;
project the set of 3D locations toward the predicted camera pose and onto a 2D image plane associated with the camera;
generate, based on the projected set of 3D locations on the 2D image plane, an activation map specifying a subset of the pixel sensors of the camera that are to be activated;
instruct, using the activation map, the camera to activate the subset of pixel sensors to capture a new image of the environment;
read pixel values of the new image corresponding to the subset of pixel sensors activated by the camera; and
track the features in the environment based on the pixel values.

9. The media of claim 8, wherein the one or more computer-readable non-transitory storage media is further operable when executed to:
receive, from the camera, a plurality of frames containing a plurality of images of the environment; and
process a set of the plurality of images to identify the features in the environment, wherein the features are indicative of a landmark in the environment.

10. The media of claim 8, wherein the one or more computer-readable non-transitory storage media is further operable when executed to:
access one or more intrinsic camera parameters of the camera and one or more camera lens distortion characteristics, wherein projecting the set of 3D locations toward the predicted camera pose and onto the 2D image plane is based on the one or more intrinsic camera parameters of the camera and the one or more camera lens distortion characteristics.

11. The media of claim 8, wherein the one or more computer-readable non-transitory storage media is further operable when executed to:
generate an occupancy grid based on the projection of the set of 3D locations toward the predicted camera pose and onto the 2D image plane, wherein the occupancy grid indicates one or more cells within the occupancy grid that are occupied by the projection of the set of 3D locations toward the predicted camera pose and onto the 2D image plane, and wherein generating the activation map is based on the occupancy grid.

12. The media of claim 11, wherein the one or more computer-readable non-transitory storage media is further operable when executed to:
analyze one or more unoccupied cells in the occupancy grid; and
determine whether to include the one or more unoccupied cells in the activation map based on a predetermined framerate.

13. The media of claim 12, wherein the camera captures a plurality of images at a first framerate greater than the predetermined framerate.

14. The media of claim 8, wherein the one or more computer-readable non-transitory storage media is further operable when executed to:
generate one or more search lines based on the projection of the set of 3D locations toward the predicted camera pose and onto the 2D image plane, wherein the one or more search lines are included in the activation map.

15. A system comprising:
one or more processors; and
one or more computer-readable non-transitory storage media coupled to one or more of the processors and comprising instructions operable when executed by one or more of the processors to cause the system to:
access a set of 3D locations associated with features in an environment previously captured by a camera from a previous camera pose;
determine a predicted camera pose using the previous camera pose and motion measurements generated using a motion sensor associated with the camera;
project the set of 3D locations toward the predicted camera pose and onto a 2D image plane associated with the camera;
generate, based on the projected set of 3D locations on the 2D image plane, an activation map specifying a subset of the pixel sensors of the camera that are to be activated;
instruct, using the activation map, the camera to activate the subset of pixel sensors to capture a new image of the environment;
read pixel values of the new image corresponding to the subset of pixel sensors activated by the camera; and
track the features in the environment based on the pixel values.

16. The system of claim 15, wherein the instructions are further executable by the one or more processors to:
receive, from the camera, a plurality of frames containing a plurality of images of the environment; and
process a set of the plurality of images to identify the features in the environment, wherein the features are indicative of a landmark in the environment.

17. The system of claim 15, wherein the instructions are further executable by the one or more processors to:
access one or more intrinsic camera parameters of the camera and one or more camera lens distortion characteristics, wherein projecting the set of 3D locations toward the predicted camera pose and onto the 2D image plane is based on the one or more intrinsic camera parameters of the camera and the one or more camera lens distortion characteristics.

18. The system of claim 15, wherein the instructions are further executable by the one or more processors to:
generate an occupancy grid based on the projection of the set of 3D locations toward the predicted camera pose and onto the 2D image plane, wherein the occupancy grid indicates one or more cells within the occupancy grid that are occupied by the projection of the set of 3D locations toward the predicted camera pose and onto the 2D image plane, and wherein generating the activation map is based on the occupancy grid.

19. The system of claim 18, wherein the instructions are further executable by the one or more processors to:
   analyze one or more unoccupied cells in the occupancy grid; and
   determine whether to include the one or more unoccupied cells in the activation map based on a predetermined framerate.

20. The system of claim 15, wherein the instructions are further executable by the one or more processors to:
   generate one or more search lines based on the projection of the set of 3D locations toward the predicted camera pose and onto the 2D image plane, wherein the one or more search lines are included in the activation map.

* * * * *